United States Patent
Klicpera

(10) Patent No.: US 12,543,669 B2
(45) Date of Patent: Feb. 10, 2026

(54) INDEPENDENT WIRELESS PROGRAMMABLE IRRIGATION VALVE

(71) Applicant: Michael Edward Klicpera, La Jolla, CA (US)

(72) Inventor: Michael Edward Klicpera, La Jolla, CA (US)

(*) Notice: Subject to any disclaimer, the term of this patent is extended or adjusted under 35 U.S.C. 154(b) by 0 days.

(21) Appl. No.: 16/507,681

(22) Filed: Jul. 10, 2019

(65) Prior Publication Data

US 2020/0015438 A1 Jan. 16, 2020

Related U.S. Application Data

(60) Provisional application No. 62/696,249, filed on Jul. 10, 2018.

(51) Int. Cl.
*A01G 25/16* (2006.01)
*G05B 19/042* (2006.01)
(Continued)

(52) U.S. Cl.
CPC ........... *A01G 25/16* (2013.01); *G05B 19/042* (2013.01); *G05D 7/0635* (2013.01); *H04W 4/80* (2018.02);
(Continued)

(58) Field of Classification Search
CPC .................. A01G 25/16; G05B 19/042; G05B 2219/25252; G05B 2219/25257; G05B 2219/2625; G05D 7/0635; H04W 4/80
See application file for complete search history.

(56) References Cited

U.S. PATENT DOCUMENTS 5,893,388 A * 4/1999 Luker .................... E03B 7/071
137/487.5
6,317,051 B1 * 11/2001 Cohen ................. G01M 3/2807
340/606

(Continued)

FOREIGN PATENT DOCUMENTS

EP 2509036 A1 10/2012

OTHER PUBLICATIONS

Consumer Reports publication downloaded on Jul. 22, 2020 rating the best marketed sprinkler controllers.

*Primary Examiner* — Zhipeng Wang

(57) ABSTRACT

The present invention relates to a wireless programmable irrigation valve that has an electrical circuit with a microprocessor, CPU and/or a microcontroller with a data memory bank that can store watering program or schedule software instructions. The wireless irrigation valve is powered by a battery or super capacitor with electric generator. The wireless programmable irrigation valve does not need to be controlled by a local controller. The wireless programmable irrigation valve is programmed using a APP on a cell phone, smart phones, mobile phone or similar apparatus or computer, and when software instructions are transmitted to the wireless programmable irrigation valve, the wireless programmable irrigation valve independently controls its valve on and off. Once the software instructions are transmitted to the wireless programmable irrigation valve, the wireless programmable irrigation valve performs the programmed water scheduled instructions independently. Thus, the rate of wireless communication can be substantially reduced (sleep mode) until updated software instructions are desired to be transmitted. In this way, electrical power can be saved to be used primary for opening and closing the solenoid mechanism, Using the energy generator, the battery or super capacitor will be able to last longer. A button on the (Continued)

wireless irrigation valve can be used to wake up the wireless communication so software instructions can be transmitted to the microprocssor, CPU and/or a microcontroller with data memory.

38 Claims, 6 Drawing Sheets

(51) Int. Cl.
G05D 7/06 (2006.01)
H04W 4/80 (2018.01)

(52) U.S. Cl.
CPC .............. G05B 2219/25252 (2013.01); G05B 2219/25257 (2013.01)

(56) References Cited

U.S. PATENT DOCUMENTS

| | | | | |
|---|---|---|---|---|
| 8,294,292 B2* | 10/2012 | Irwin | ................. | F03B 3/02 290/54 |
| 10,101,753 B1* | 10/2018 | Levine | ................. | A01G 25/165 |
| 10,124,358 B1* | 11/2018 | Graham | ................. | B05B 12/12 |
| 10,225,997 B1* | 3/2019 | Levine | ................. | A01G 25/167 |
| 10,306,844 B1* | 6/2019 | Levine | ................. | G05B 15/02 |
| 2006/0027677 A1 | 2/2006 | Abts | | |
| 2006/0181390 A1 | 8/2006 | Zigmond | | |
| 2006/0202051 A1* | 9/2006 | Parsons | ................. | F16K 31/02 239/69 |
| 2007/0293990 A1* | 12/2007 | Alexanain | ................. | A01G 25/16 700/284 |
| 2010/0179701 A1 | 7/2010 | Gilbert | | |
| 2010/0270803 A1* | 10/2010 | Irwin | ................. | F03B 13/00 290/54 |
| 2011/0111700 A1* | 5/2011 | Hackett | ................. | H04W 72/23 455/41.2 |
| 2013/0173070 A1* | 7/2013 | Tennyson | ................. | G05B 15/02 700/284 |
| 2013/0207771 A1* | 8/2013 | Ersavas | ................. | G05B 15/02 340/3.1 |
| 2014/0039697 A1 | 2/2014 | Weller | | |
| 2014/0129039 A1 | 5/2014 | Olive-Chaninian | | |
| 2014/0222223 A1* | 8/2014 | Horton | ................. | G05D 7/0617 700/284 |
| 2015/0204701 A1* | 7/2015 | Klicpera | ................. | G01M 3/00 137/624.11 |
| 2015/0319942 A1* | 11/2015 | Thomas | ................. | A01G 25/16 239/69 |
| 2016/0100533 A1* | 4/2016 | Bauman | ................. | G05B 15/02 700/284 |
| 2016/0158783 A1* | 6/2016 | Wiebe | ................. | A01G 25/16 239/69 |
| 2016/0163177 A1* | 6/2016 | Klicpera | ................. | E03B 7/071 137/59 |
| 2017/0156274 A1* | 6/2017 | Carlson | ................. | G05B 19/042 |
| 2017/0172077 A1* | 6/2017 | Wouhaybi | ................. | A01G 25/16 |
| 2018/0014480 A1* | 1/2018 | Montgomery | ................. | A01G 25/16 |
| 2018/0160636 A1* | 6/2018 | Hester | ................. | A01G 25/165 |
| 2018/0184600 A1* | 7/2018 | Charling | ................. | A01G 25/167 |
| 2018/0220602 A1* | 8/2018 | Mora | ................. | F16K 31/088 |
| 2018/0358009 A1* | 12/2018 | Daley | ................. | G06F 3/167 |
| 2020/0214231 A1* | 7/2020 | Beeri | ................. | A01G 25/165 |

* cited by examiner

INDEPENDENT WIRELESS PROGRAMMABLE IRRIGATION VALVE

RELATED APPLICATIONS

This application claims the filling date benefit of U.S. Provisional Application 62/696,249 filed on Jul. 10, 2019. These Application is incorporated herein by this reference.

FIELD OF THE INVENTION

The present invention relates generally to irrigation systems. More specifically, this invention relates to a independent wireless programmable irrigation valve that has electric components and wireless communication technology and that does not need a local irrigation controller to perform an irrigation program or schedule.

BACKGROUND OF THE INVENTION

Irrigation systems traditionally are used in many different applications for properties (public, governmental, private, residential, commercial, etc.) including, for example, landscape or yard maintenance, golf courses, and farming. Traditionally, when the irrigation system is installed, trenches are dug for the water piping. Trenches are generally used for the electrical wiring that connects an irrigation controller to one or more irrigation valves. Generally, the wiring is a 24 AC power line that electronically opens/closes a solenoid control valve. The control valve is coupled to a water supply pipe, and when 24 volts is applied to the typical solenoid mechanism, the control valve opens allowing water to flow through the water pipe to one or more sprinkler heads. When no voltage is applied to the power line, the mechanism closes the valve, shutting off water flow. The required in-ground electrical wiring may less inconvenient solution when a water system is first being installed, because the trenches need to be dug anyway for the water pipes in order to get water to various locations. But codes may not allow water and electrical wiring in the same trench. Similarly, if a new zone is being added to an existing irrigation system, there will be a need to dig a trench all the way from the irrigation controller to the valve(s) for the new zone because the original water pipes are already installed. Therefore, connecting the irrigation controller, electrical wiring, to the irrigation valve(s) can be a very laborious task.

Additionally, a number of other problems are created by installation and use of a standard irrigation system, which includes an irrigation controller connected by electrical wiring to irrigation valve(s). The irrigation controller and electrical wiring are subject to lightning surges that can damage the components of the irrigation system. Further, electrical wires whether over-ground or underground deteriorate over time and are subject to damage such as due to environmental or weather-related impacts; gardening, landscaping, or digging; or animal activity. Deteriorated or broken wires will cause the irrigation system to fail. Still further, adding valves to a new or existing irrigation system requires trenching or re-trenching, designing around existing construction and landscaping, or demolishing and replacing existing construction and landscaping. In addition, the placement of irrigation wiring can limit the location of landscaping features or development of the property. Finally, irrigation wires, once buried, can be difficult to locate, Additions or modifications to the irrigation wiring and repairs or maintenance of the irrigation wiring can require the use of special equipment to locate electrical wires and/or wire breaks. All of these undesirable factors associated with standard irrigation systems can be very costly and burdensome.

Most irrigation companies still require an irrigation controller to communicate with wired or wireless technology, to the irrigation valve. Published patent application US20150005965, assigned to Rain Bird Corporation, discloses an irrigation valve that is controlled wirelessly by an irrigation controller. The watering schedule is programmed and maintained by the irrigation controller and when a watering event is scheduled to occur, the controller wirelessly transmits a corresponding electrical signal to the receiving electrical circuitry of the irrigation valve to control the solenoid for an "on" or "off" operation.

There are some irrigation systems that use a battery to supply power to an irrigation valve, such as those marketed by Orbit and Galcon, and to a lesser event by Irritrol, Rain Bird, and Hunter. These Orbit and Galcon products require programming of the battery powered irrigation valve using an LED or LCD display with control buttons with a display on the valve body or valve body extension, but these products have no wireless communication means. Using the display and buttons on the irrigation valve for programming the watering schedule is cumbersome and inconvenient. These Irritrol, Rain Bird and Hunter products have an irrigation controller that is hard wired to a battery powered irrigation valves. A newer product by Orbit, the B-Hive irrigation controller, allows cell phone programming but again uses a separate and independent irrigation controller.

It would be advantageous to not require use of a separate or independent irrigation controller for communicating with and controlling irrigation valve(s).

It would also be advantageous to have irrigation valves that do not require electrical wiring from an irrigation controller to power and control the irrigation valves.

It would be further advantageous that the irrigation valve can be powered and controlled by a battery or super capacitor that can be optionally supplemented with a water energy generator.

It would be further advantageous that the water energy generator can perform as a water flow rate meter whereby water parameter data can be recorded and transmitted to remote locations or remotely for data information access.

It would be further advantageous that the irrigation valve can be programed in advance and before installation.

It would be further advantageous to use a pressure sensor with the independent wireless programmable irrigation valve to provide further calibration data for the water energy generator to function as a water flow rate sensor.

It would be further advantageous that the watering program or schedule be downloaded to the independent irrigation valve using a convenient device like a cell phone, smart phones, mobile phone or similar apparatus, or remote computer.

It would be further advantageous that once the one or more watering programs or schedules are downloaded, the irrigation valve can function without any further inputs until the one or more programs or schedules needs to be modified.

It would be further an advantageous that the wireless irrigation valve can be programmed by a cell phone, smart phone, mobile phone or similar apparatus, or remote computer with a custom watering program or scheduling APP using Wi-Fi, Wi-Fi3, Bluetooth, LoRa technology, ZigBee, Z-wave or other wireless technology.

SUMMARY OF THE INVENTION

The present invention relates to an independent wireless programmable irrigation valve comprising an irrigation valve that has an electrical circuitry with a microprocessor, CPU and/or a microcontroller that has one or more data memory banks (preferably mounted on a printed circuit board or PCB) that can store and process one or more watering programs or schedules encoded by software instructions. Various security codes and technology can be used to operate and program the independent wireless programmable irrigation valve to thwart theft or modifying the water schedule. In addition, geolocation technology can be used to disable the independent wireless programmable irrigation valve once programmed. The independent wireless programmable irrigation valve is powered by a battery and/or super capacitor with an optional water energy generator. The water energy generator can be developed, programmed and calibrated to provide water flow rate data. An optional pressure sensor can also be mounted within the independent wireless programmable irrigation valve. The optional pressure sensor can be used to provide further calibration information for the water energy generator to more accurately monitor water flow or determine is pressure readings indicate a problem. The independent wireless programmable irrigation valve can be programmed at the factory for common irrigation cycles (high frequent watering, regular medium water frequency, and low maintenance setting for drought tolerate plants). Whether programmed at the factory or by the user, once programmed, the independent wireless programmable irrigation valve does not need a remote controller to perform the watering operations. The independent wireless programmable irrigation valve can be programmed by a cell phone, smart phone, mobile phone or similar apparatus, or remote computer utilizing a custom watering program or scheduling APP. When the software is transmitted to the independent wireless programmable irrigation valve, the circuitry and software independently controls the valve on and off. The wireless irrigation valve does not need a local irrigation controller to send power or scheduling signals. Once the custom watering program or schedule software instructions are downloaded to the independent wireless programmable irrigation valve, the rate of wireless communication can be significantly reduced (sleep mode) until an update or modified scheduling software instruction is required. In this way, electrical power can be saved for the primary use of opening and closing the solenoid mechanism. The optional water energy generator will enable the battery and/or super capacitor to last longer than using the battery and/or super capacitor alone. Furthermore, the optional water energy generator will allow for less restricted wireless communications, for example when uploading water flow data to the internet and/or remote servers/database or when downloading weather data for a rain shut-off mode. A button or switch on the independent wireless Programmable irrigation valve body can be used to wake up the wireless communication so software instructions can be transmitted to the microprocessor, CPU and/or a microcontroller with data memory. One or more other buttons or switches can also be included and used to manually turn on and off the independent wireless programmable irrigation valve. The cell phone, smart phone, mobile phone or similar apparatus, or the remote computer can utilize a custom watering program or scheduling APP from a convenient or remote location and then transmit the watering program (s) or schedule(s) to the one or more independent wireless programmable irrigation valves.

BRIEF DESCRIPTION OF THE DRAWINGS

The above and other aspects, features and advantages of the present invention will be more apparent from the following more particular description thereof, presented in conjunction with the following drawings, wherein.

DESCRIPTION OF THE PREFERRED EMBODIMENTS

Figure 1A:
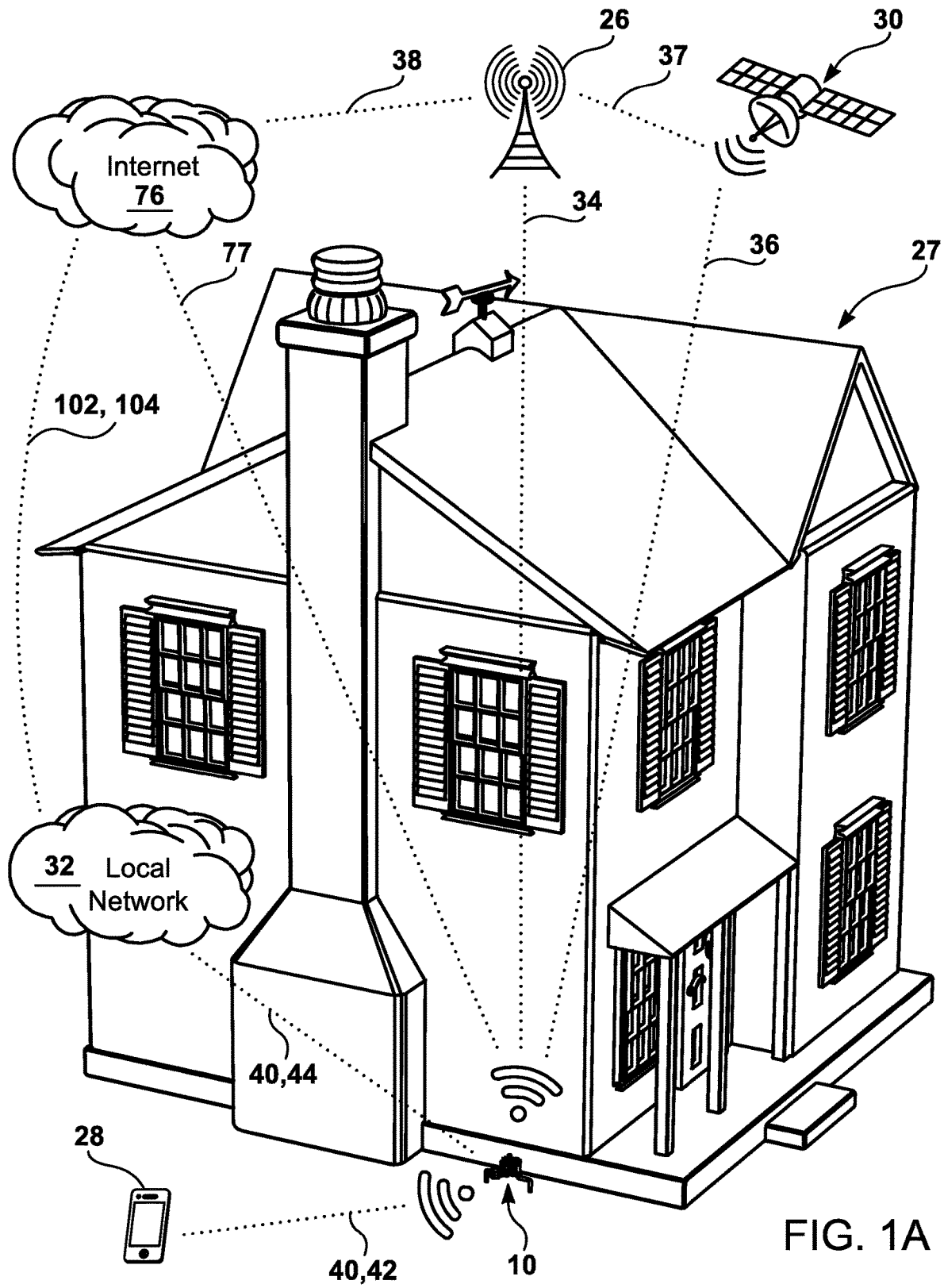
FIG. 1A is a perspective environmental illustration showing a typical residence with the present invention independent wireless programmable irrigation valve having a plurality of wireless communication means.

The following description is not to be taken in a limiting sense but is made for the purpose of describing the preferred embodiments or principles of the invention.

Paragraphs below provide definitions for terms used in this application.

Authentication refers to the technology that ensures one or more messages, data, control signals or information that is downloaded or transferred from one person or a device to another declared or intended person or device.

Encryption refers to a privacy technology that prevents anyone but the intended recipient(s) to download, transfer, review or read confidential one or more messages, data, control signals, and/or information.

Integrity refers to technology that ensures that one or more messages, data, control signals, and information is not altered in any way during transit.

Non-repudiation refers to the technology that prevents a sender from denying that one or more messages, data, control signals, and/or information was sent.

Cellular format technology refers to all current and future variants, revisions and generations (e.g. third-generation wireless mobile telecommunication technology and protocols (3G), fourth-generation wireless mobile telecommunication technology and protocols (4G), fifth-generation wireless mobile telecommunication technology and protocols (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD and other formats for utilizing cell phone, smart phones, mobile phone or similar apparatus technology, telephony antenna distributions and/or any combinations thereof, and including the use of satellite, microwave technology, the internet, cell tower, telephony and/or public switched telephone network lines.

A cell phone, smart phone, mobile phone or similar apparatus includes all cellular phones using channel access or format methods defined above (with cellular equipment, public switched telephone network lines, satellites, towers, and/or mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all similar or future tablets manufactured by these and other manufactures), Apple IPOD Touch, or a television, timepiece or digital watch, computerized glasses, and other similar apparatus with Wi-Fi and wireless capability, and remote computers and controllers having internet or wireless connectivity.

The wireless electronic communication described herein (e.g. Bluetooth, Wi-Fi, Wi-Fi3, ZigBee, Z-Wave, LoRa) corresponds to the concept of "internet of things" (IoT) and is defined herein as a network of physical objects or things that is comprised of independent wireless, programmable irrigation valve and local routers or servers and/or remote network and Internet connectivity, which enables apparatus to collect and exchange data. The internet of things allows devices to be sensed and controlled remotely across existing network infrastructure, creating opportunities for more direct integration between the physical world and computer-based systems, and resulting in improved efficiency, monitoring accuracy and economic benefit. The internet of things encompasses technologies such as smart grids, smart homes, and intelligent wire and wireless electronic communication.

Now referring to FIG. 1A which is a perspective environmental illustration showing a typical residence 27 with the present invention independent wireless programmable irrigation valve 10 including one or more wireless communication means. The independent wireless programmable irrigation valve does not need a separate or individual irrigation controller assembly to send irrigation program or water scheduling control signals. Therefore, there are no zone limitations, nor do wireless control signals need to be sent to the irrigation valve on a timed (e.g. daily or weekly) water schedule from a separate or individual irrigation controller. Furthermore, the use of an irrigation controller with hard-wired technology is cumbersome to install and the use of an irrigation controller with Wi-Fi signal has limited range.

The present invention programmable wireless irrigation valve 10 conducts all the operations of the separate and independent controller assembly and plurality of zone-controlled irrigation valves without the need for the separate and independent controller assembly. The present invention, independent wireless programmable irrigation valve 10, cand utilize long range transceivers or radio(s) and hub technology that facilitates for longer distance wireless communication. A typical cell phone, smart phones, mobile phone or similar apparatus 28 which has downloaded a custom watering irrigation scheduling APP (not shown) and is used to communicate with the programmable wireless irrigation valve 10 with WiFi/WiFi3 40 or Bluetooth 44 wireless technology to program the programmable wireless irrigation valve 10. Once the custom watering irrigation schedule is downloaded to the programmable wireless irrigation valve 10, no further wireless or wired communication is necessary for the programmable wireless irrigation valve 10 to perform the programmed watering schedule. The present invention programmable wireless irrigation valve 10 can be programmed and installed virtually in any location with no further involvement, being able to perform the programmed irrigation schedule on its own. And this eliminates the need and cost for a separate and independent irrigation controller assembly. Shown in FIG. 1A are other potential wireless communication transceiver such as the WiFi/WiFi3 40 or LoRa or WiMAX 44 that communicates with a local network 32 utilizing a hub 68 that converts the long range LoRa or WiMAX radio technology into WiFi which communicates wirelessly 102, 104 to a router 100 and then to the internet 76. The programmable wireless irrigation valve 10 can also have a wireless radio that directly communicates wirelessly 77 to the internet 76. Alternately, the programmable wireless irrigation valve 10 can have a cellular transceiver or radio that communicates wireless 34 with cell tower technology which then communicates 32 with the internet 76. Also, the programmable wireless irrigation valve 10 can have a wireless radio technology that can communicate 36 with a satellite 30 that can communicate 37 to a cellular tower technology 26 and then wireless communicates 32 to the internet 76. The plurality of wireless communications will allow the programmable wireless irrigation valve 10 to be programmed remotely, In addition, the plurality of wireless communication will allow the programmable wireless irrigation valve 10 to download software updates, weather data, and remote instructions (e.g. turn on the programmable wireless irrigation valve 10). And as discussed in more detail below in FIG. 2, the water energy generator can have the capability to perform as a water rate sensor which can send water use data wirelessly to remote computers/servers.

Figure 1B:
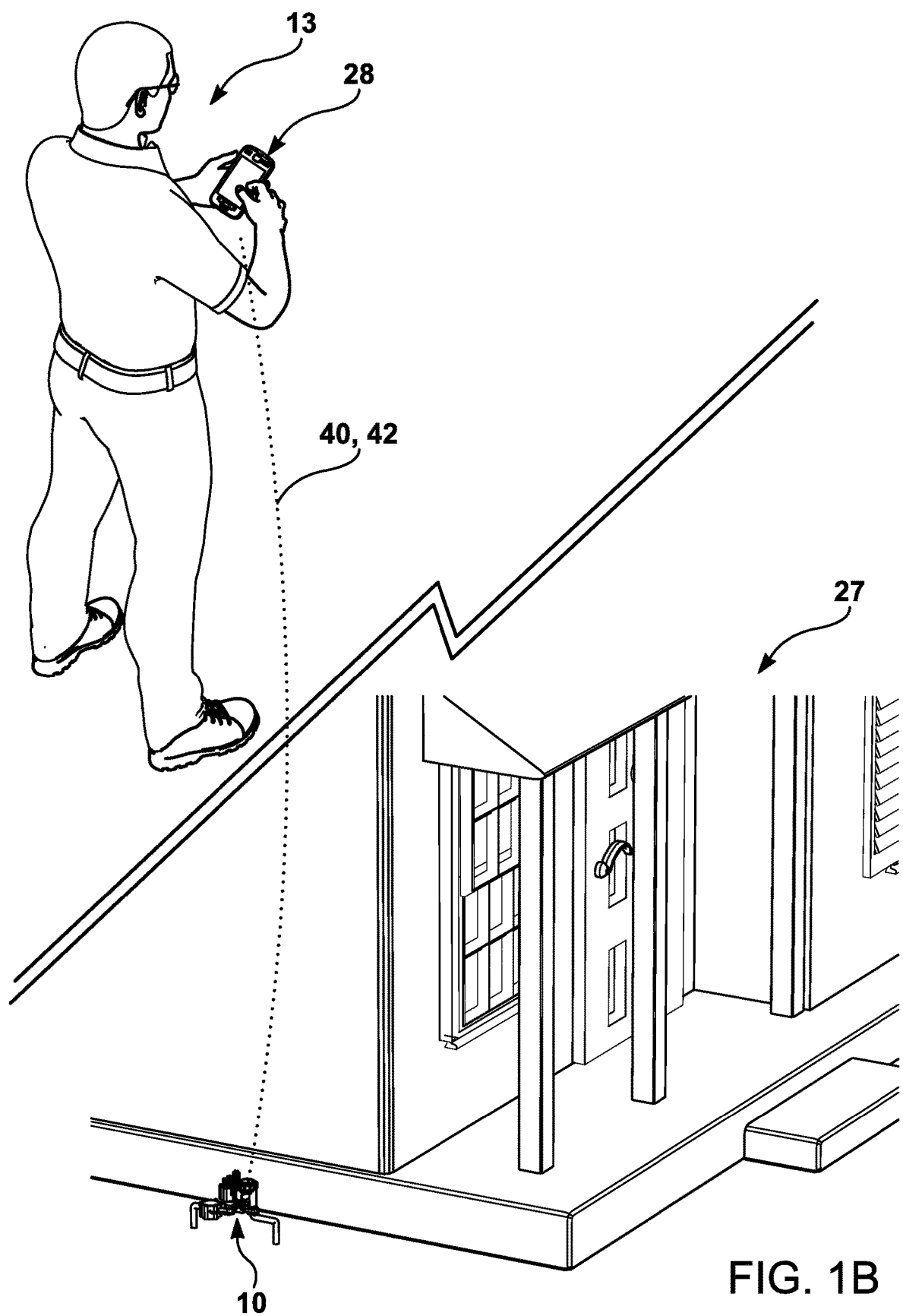
FIG. 1B is a perspective environmental illustration showing the independent wireless programmable irrigation valve uploading software instructions of a custom watering program or schedule, which is being downloaded by an individual with his/her cell phone, smart phone, mobile phone or similar apparatus, or remote computer utilizing a custom watering program or scheduling APP.

Referring to FIG. 1B, shown is a perspective environmental illustration demonstrating the independent wireless programmable irrigation valve 10 uploading a custom watering program or schedule software instructions 52 being downloaded by an individual with his/her cell phone, smart phones, mobile phone or similar apparatus with a custom watering programming or scheduling APP 50 using wireless transfer technology 58. Again, there is no need for a separate and independent controller assembly. The independent wireless programmable irrigation valve 10 can be located far away from the large homes or structures and still independently function as designed and programmed. For example, in farm, nurseries and large residence or large operations, the independent capability of the independent wireless independent wireless programmable irrigation valve 10 can be remotely located for a long distance from the large residence, farm and/or nursery environment, or other large operations.

Figure 1C:
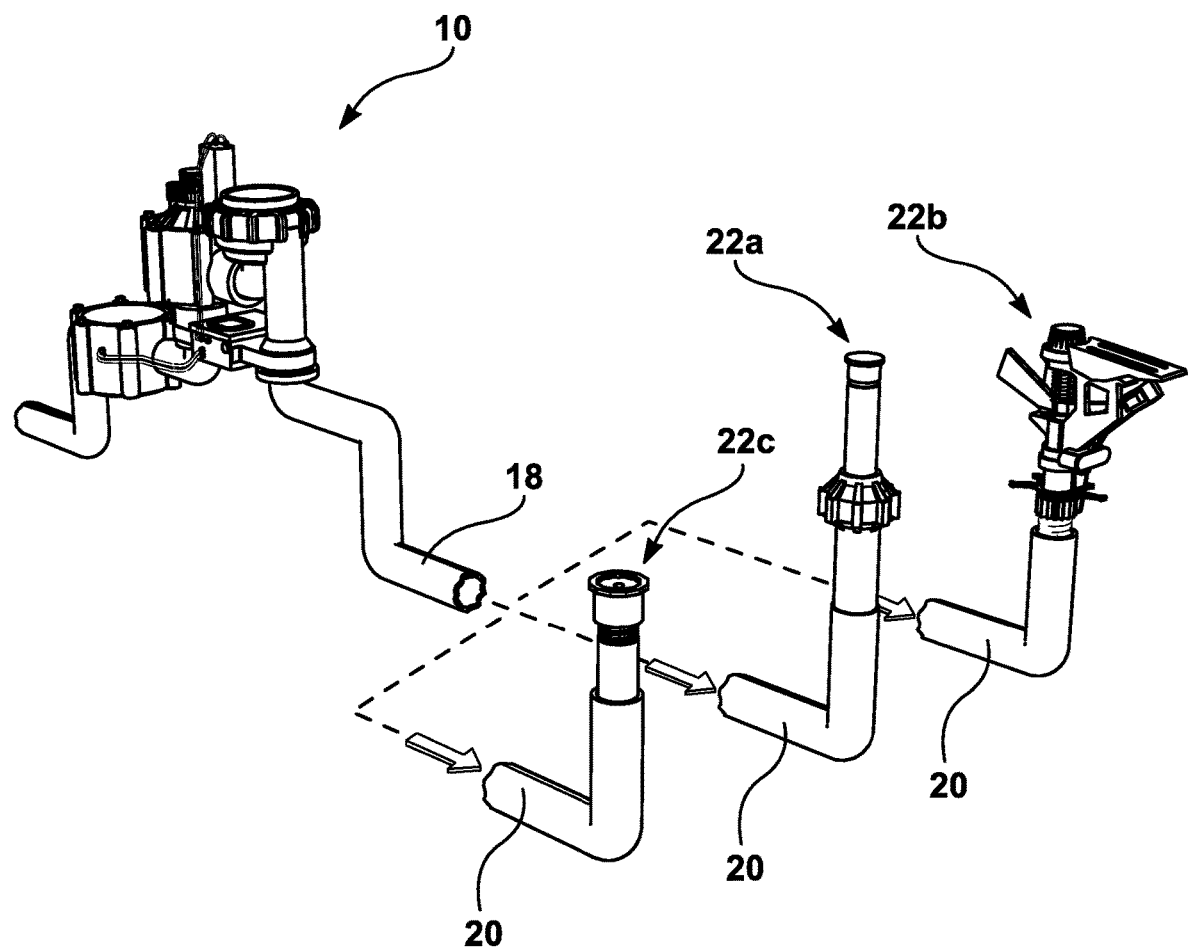
FIG. 1C is a perspective illustration showing the present invention independent wireless programmable irrigation valve connecting to typical water sprinkler distribution lines.

FIG. 1C is a perspective illustration showing the present invention independent wireless programmable irrigation valve 10 connecting to a typical plurality of sprinkler distribution lines 20. Shown are some different types of sprinklers 22a (pop-up spray head), 22b (impact rotor head) and 22c (non-pop-up spray or bubbler head) that can be used with the present invention wireless programmable irrigation valve 10. Each independent wireless programmable irrigation valve 10 can be coupled to one or more different sprinklers, bubbler head or other watering device and can be defined as a zone.

Figure 2:
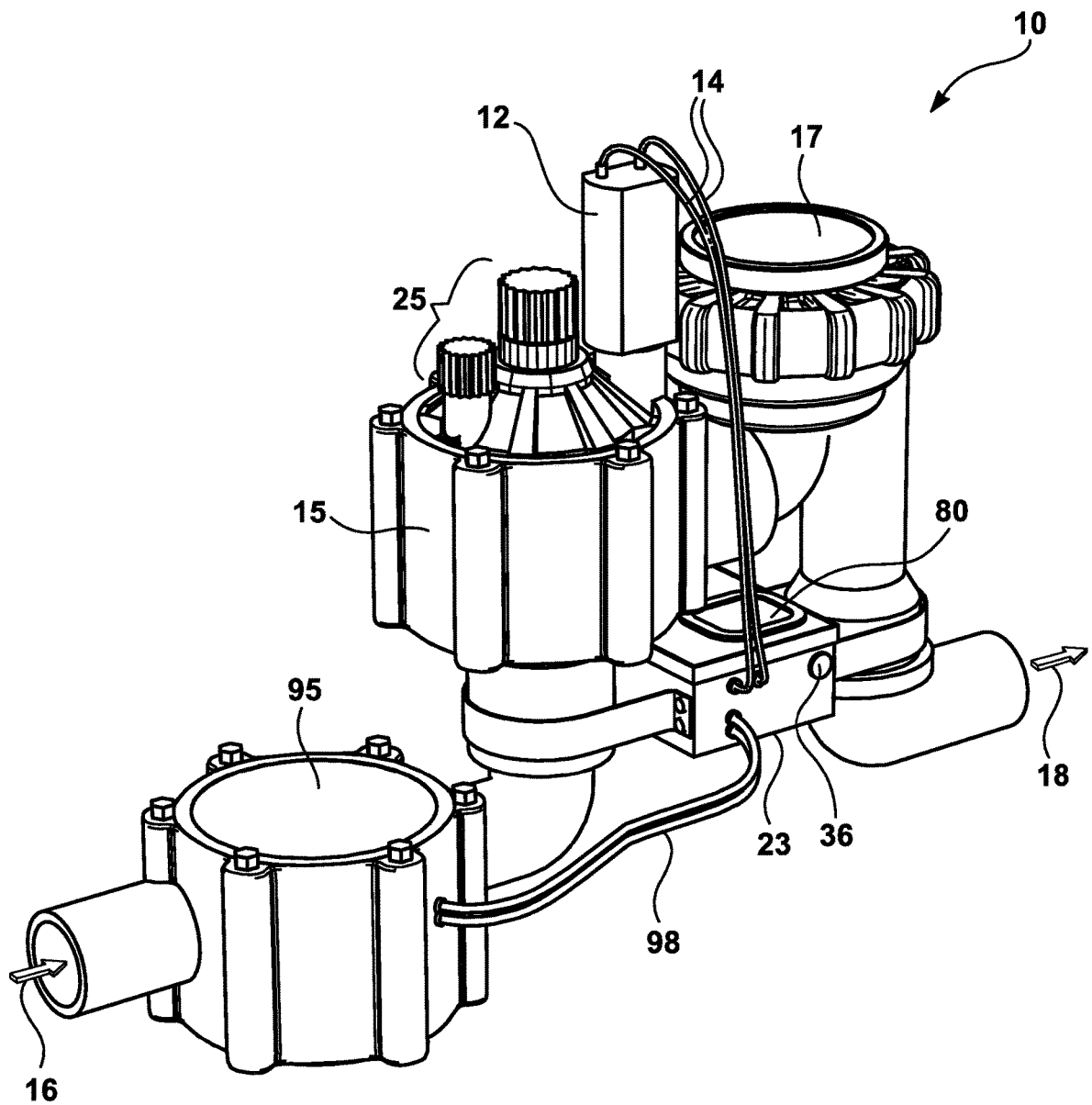
FIG. 2 is a perspective illustration showing the independent wireless Programmable irrigation valve main components, with this valve having a water supply input, a water output for dispensing water to one or more sprinklers, an electronic circuit board with a microprocessor, CPU and/or microcontroller with a data memory bank and having one or more radios and powered by a battery and/or a super capacitor, and an optional water energy generator.

Now referring to FIG. 2 which shows a perspective illustration showing the independent wireless programmable irrigation valve 10 main components, with the valve having a water supply input 16 and a water output 18 for dispensing water through one or more sprinkler lines 20 to one or more sprinklers 22, electronic circuitry 24 (shown in FIG. 3), preferably mounted on a PCB, and contained within a housing 23 that is water resistant or water-proof. In the exemplary valve represented in FIG. 2, shown is the diaphragm housing 15 which contains the elastomeric diaphragm and various water orifices with a solenoid 12 mounted in close proximity to the diaphragm housing 15. One or more adjustment knobs 25 are used to modify the spray pattern or length. Before the water supply outlet 18 is shown an anti-backflow valve 17, a component that is utilized with most common designed valves for residential use. However other irrigation valves, such as in-line irrigation valve, do not include the anti-backflow valve 17. Mounted between the diaphragm housing 15 and the anti-backflow valve 17 is the electronic circuitry housing 23 that contains the electrical circuitry 24 which controls and performs the download, storage of irrigation programs, radios, and other capabilities. Most irrigation valves use solenoid technology 12 that utilizes electromagnets that move or reposition a plunger attached to the valve to open or close the water supply. Generally removing power from the electromagnet allows a spring or other force to return the plunger to its original position. In the typical irrigation valves used for automated sprinklers, water pressure from the line presses a diaphragm to keep the valve closed. Water enters the valve from the system main line and exerts a force against the center of the valve's diaphragm. A small orifice in the diaphragm allows the water to flow through to the upper chamber between the diaphragm and the bonnet. The water continues to travel on through a port in the bonnet to the solenoid area. The solenoid has a light spring-loaded metal piston that, when the valve is closed, covers the inlet port hole. The surface area that the water comes in contact with on top of the diaphragm is greater than the surface area on the bottom of the diaphragm, so the valve stays closed until the water in the upper chamber is released. When the electrical impulse moves the plunger, it opens a small hole that allows the water pressure to drain, and pressure from the opposite side moves the diaphragm up to open the main valve providing water flow to the sprinklers. As long as the small port is open, water continues to flow to the system. Removing power from the electromagnet closes the port, and the diaphragm again fills with water. Once the pressure behind the diaphragm reaches the critical point, the water pressure forces the valve to close and the sprinklers stop spraying water. In the normally closed solenoid valve, the valve remains closed unless the magnet receives power. For some applications, a normally open valve is more appropriate and in these solenoid valves, applying power closes the valve. The typical solenoid used in battery power situations is the latching type solenoid 12 which is known to have very energy efficient characteristics. The solenoid mechanism 12 is connected to the electrical circuitry contained with a housing 23. The electrical circuitry housing 23 has a pair of wires 14 connected to the solenoid mechanism 12. An optional display 80 is shown on the top of the housing 23 but can be placed in other locations on the housing 23 to indicated the operation position of the solenoid mechanism 12. An optional "wake up button" 36 is shown mounted on the electrical circuitry housing 23 that will describe its function later herein, Also shown in FIG. 2 is a water energy generator 95 with electricity generation wiring 98. The term water energy generator can refer to different types of water electrical generators that are turbine, paddle, Pelton or other rotational similar type technology. In this embodiment where the water energy generator is utilized adjacent to and/or incorporated into the valve body, the energy requirements can be modified. Most of the time, when an irrigation valve opens, the water flowing through the associated piping is at maximum flow rate. This assists the water energy generator to provide electricity generation for supplementing the battery(ies) or super capacitor(s). In addition, wireless communication can be utilized primarily during the time electrical energy is being generating for the purposes of gathering weather forecast weather data or transmitting flow information to a remote router and then over the internet to remote servers and databases. The imbedded software residing in the permanent data memory bank in the electronic circuitry of the independent wireless programmable irrigation valve, can make decisions about when to maximize energy use, charging rates to the battery(ies) or super capacitor(s), download weather (rain in the forecast) decisions to temporarily modify the downloaded program or schedule, update imbedded software, etc. The independent wireless programmable irrigation valve 10 can be pre-programmed at the factory for high irrigation needs (e.g. every day at 6:00 a.m. watering for 10 minutes intervals) or medium irrigation needs (e.g. every other day at 6:00 a.m. watering for 7 minutes) or low irrigation needs (e.g. once a week or month 6:00 a.m. watering for 5 minutes), The factory pre-programming feature can be easily modified to change the starting time or duration of the watering schedule using the APP on the cell phone, smart phones, mobile phone or similar apparatus 48. The pre-programming feature is desirable as most current battery operated or controller operation software are confusing, overcomplicated and non-intuitive. The software can also be downloaded by cell phone, smart phones, mobile phone or similar apparatus 48 can broadcast independent schedules a plurality of independent wireless programmable irrigation valves 10 simultaneously.

The independent wireless programmable irrigation valve 10 can have security features embedded into the design to thwart stealing the device from installed location by unscrupulous third parties. One of the security features is that a security code or MAC address will be printed on the shipping container or printed on the installation and operation instruction sheet in a manner that minimizes distribution of this security number. The MAC address is also generally also embedding in the manufacturing software. When an individual desire to program the independent wireless programmable irrigation valve 10 with an APP on the cell phone, smart phones, mobile phone or similar apparatus 48, the APP will require inputting the security code before programming will be allowed. And multiple inputs of the wrong security number can erase the water schedule memory or render the independent wireless programmable irrigation valve 10 non-functional and needs to be returned to the factory for reinstalling functionality. Also geolocation technology can be utilized (turned on) to disable the independent wireless programmable irrigation valve 10 when moved from a particular location which will require the security code or MAC address to enable functionality. Geolocation will be an option in the program instruction for the user to select. Geolocation will therefore require GPS, triangulation with cell towers, or other technology, to operate effectively.

Since most sprinkler (except bubbling heads) utilize full water volume or pressure most, if not all of the time, the duration of water use (and total volume) can be easily monitored. Furthermore, the water energy generator generally has a linear or projected line of data points for electricity energy produced versus the water flow rate. Due to this data relationship, the water energy can simultaneously function as a water rate flow meter. As the water energy generator can function as a water meter, the present invention independent wireless programmable irrigation valve 10 can automatically transmit, or it can be a selected option in the custom cell phone, smart phones, mobile phone or similar apparatus custom watering program APP, to transmit flow data parameters utilizing Wi-Fi, Wi-Fi, LoRa or WiMAX radio technology to a selected router/server and then through the internet to remote computers and database(s). The water parameters that can be monitored, recorded and transmitted by the battery powered or water energy generator and the electrical circuitry 24 of the present invention independent wireless programmable irrigation valve 10 that utilizes a CPU, a microprocessor, or a microcontroller, or any combination thereof, to include instructions that, when executed, configures the one or more water flow rate sensors to monitor at least one of a (i) duration of water flow, (ii) water flow rate, and (iii) total water used or any combination thereof, during each sprinkler event (sprinkler turns on and off.

Figure 3:
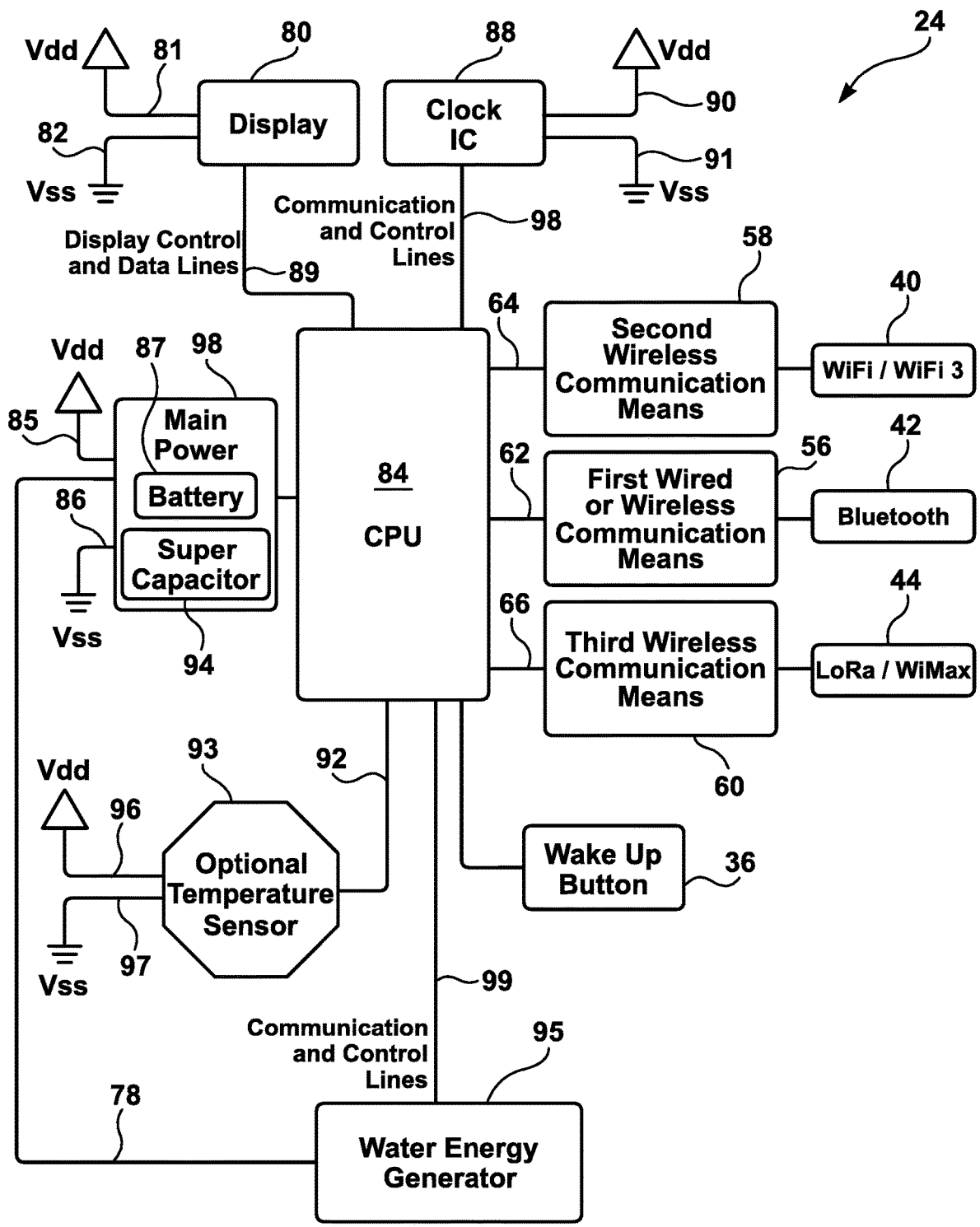
FIG. 3 is perspective illustration showing the main components of the electronic circuitry of the independent wireless programmable irrigation valve with a CPU, microcontroller, and/or microprocessor, clock, power supply, water energy generator, optional temperature sensor, optional display means and exhibiting a plurality of wireless radios.

As shown in more detail in FIG. 3, the electronic circuitry 24 includes a CPU, microprocessor and/or microcontroller 84 with a data memory bank and having a first wireless communication transceiver 62 connected to a Bluetooth radio 42, a second wireless communication transceiver or radio 64 connected to a WiFi/WiFi3 40, and/or a third communication transceiver or radio 66 connected to LoRa/WiMax 44 radio. The electrical circuitry 24 is powered by one or more batteries 87 and/or one or more super capacitors 94 that functions to power the CPU, microprocessor and/or microcontroller and other components of the electronic circuitry 24. The water turbine energy generator 95, can be an optional or standard apparatus that provides additional electrical energy to the batteries 87 or super capacitors 94. The electrical circuitry has a clock IC 88, with a power source 90 and a ground source 91, that is connected to the CPU, microprocessor and/or microcontroller 84. Also connected to the CPU, microprocessor and/or microcontroller are optional display 80, with a power source 96 and a ground source 97, and/or an optional temperature sensor 93 with a power source 81 and a ground source 82.

The independent wireless programmable irrigation valve 10 includes electronic circuitry 24 that incorporates a microprocessor, CPU and/or microcontroller 26 with a data memory bank (preferably mounted on a printed circuit board or PCB) for uploading the watering program or scheduling software instructions 52. One of the main features of the present invention is that once the watering program or schedule software instructions 52 is wirelessly transferred 58 to the data memory bank 30, the electronic circuitry 24 and the microprocessor, CPU and/or microcontroller 26 can operate the wireless programmable irrigation valve 10 and perform the water program or schedule program instructions 52 without any further input or control from a remote device such as a local irrigation controller. The electronic circuitry 24 can have several radios for different applications. The Bluetooth radio technology 36 will be utilized to transfer the watering program or scheduling software from a custom watering programming or scheduling APP 50 on a cell phone, smart phones, mobile phone or similar apparatus 48.

Bluetooth is a short-range wireless technology standard that is used for exchanging data between fixed and mobile devices over short distances based on the IEEE 802.15.1.

Z-Wave operates on varying radio frequencies. For example in Europe it operates at the 868-869 MHz band while in North America the band varies from 908-916 MHz when Z-Wave is operating as a mesh network and 912-920 MHz when Z-Wave is operating with a star topology.

Zigbee is defined in IEEE 802.15.4 for high-level communication protocols used to create personal area networks in a low-power, low-data-rate, wireless ad hoc network.

Wi-Fi and Wi-Fi3 38, a wireless network protocol based on an IEEE 802.11 standard, can be used to communicate with a wireless router/server and download the watering program or schedule to the wireless programmable irrigation valve 10 from a remote computer running a custom watering program or APP. Again, once the watering program or schedule is wirelessly transferred to the data memory bank of the electron circuitry, the microprocessor, CPU and/or microcontroller can operate the irrigation valve and perform the water program or schedule without any further input or control from a remote device such as an irrigation controller. Once the watering program or schedule is downloaded, a specific code will, up completion of the download, to significantly reduce the use of the wireless radios. The radio(s) will be in a low power sleep mode basically until an awakening event occurs. The radio(s) can be awaken, but pushing a manual button on the housing of the programmable wireless irrigation valve which connects to the electronic circuitry and sends a signal to awake the radio(s) for a period of time (e.g. 10 minutes). This period of time can used to download another update or adjust a watering program or schedule. Alternately, the radio(s) can sleep for a period of time and then awaken periodically and look for an incoming request to download another, update, or adjust a watering program or schedule. The electronic circuitry will have a clock mechanism for performing the sleep and awake radio operations, and the clock can intelligently decrease the awake periods during night hours e.g. 12:30 a.m. to 6:00 a.m. when re-programming is unlikely to occur.

Wi-Fi and Wi-Fi3 can be used to communicate with wireless router/server and download the watering program or schedule to the independent wireless programmable irrigation valve from a remote computer running a custom watering program or APP.

When Wi-Fi and/or Wi-Fi3 is out of range, or at a relatively long distance from the wireless router/server for downloading the watering program or schedule to the independent wireless programmable irrigation valve from a remote computer of sending water flow data to the router/server, LoRa (Long Range, Low Power), a low power and long-range chirp spread modulation technology, or LoRaWAN wireless technology can be utilized. The LoRaWAN specification is a Low Power Wire Area (LPWA) networking protocol designed to wirelessly connect battery operated 'things' to the internet in regional, national, or global networks and target key Internet of Things (IoT) requirements such as bi-directional communication, end-to-end security, mobility and localization services.

The LoRa will need a communication hub as an access point to communicate with the router or server. The communication hub will function receive the LoRa data from the independent wireless programmable irrigation valve and, convert this to Wi-Fi or Wi-Fi3 format which can be received by the typical wireless router or server. This long range might be necessary for larger homes, ranches, farm sites or anywhere there is substantial distance between the independent wireless programmable irrigation valve and the intended destination router/server. It is anticipated that the communication hub or repeaters can also be utilized to increase the Wi-Fi, Wi-Fi3, WiMAX, Z-wave, Zigbee, and cellular technology and/or LoRa range.

WiMAX (Worldwide Interoperability for Microwave Access) is. a technology standard for long-range wireless networking, for both mobile and fixed connections. While WiMAX was once envisioned to be a leading form of internet communication as an alternative to cable and DSL, its adoption has been limited. WiMAX is developed by an industry consortium, overseen by a group called the WiMAX Forum, who certifies WiMAX equipment to ensure that it meets technical specifications. Its technology is based on the IEEE 802.16 set of wide-area communications standards. WiMAX has the advantage of relatively low cost and flexible nature. It can be installed faster than other internet technologies because it can use shorter towers and less cabling, supporting even non-line-of-sight (NLoS) coverage across an entire city or country. WiMAX supports several networking usage models.

- A means to transfer data across an Internet Service Provider network, commonly called a backhaul.
- A form of fixed wireless broadband internet access, replacing satellite internet service
- A form of mobile internet access that competes directly with LTE technology
- Internet access for users in extremely remote locations where laying cable would be too expensive Because WiMAX is wireless by nature, the further away from the source that the client gets, the slower their connection becomes. This means that while a user might pull down 30 Mbps in one location, moving away from the cell site can reduce that speed to 1 Mbps or next to nothing. Similar to when several devices suck away at the bandwidth when connected to a single router, multiple users on one WiMAX radio sector will reduce performance.

Another security feature for independent wireless programmable irrigation valve 10 can be incorporated into the design to thwart stealing the device from installed location(s) by unscrupulous third parties. Using the its wireless capability, misappropriated independent wireless programmable irrigation valve(s) 10, once reported stolen, can utilized wireless communication to send one or more signals to disable or render the independent wireless programmable irrigation valve 10 non-functional. Alternately, the wireless communication can include hardware or software triangulation or GPS tracking technology and with the wireless communication and report the new location of the independent wireless programmable irrigation valve 10.

In the alternate embodiment where the water energy generator is utilized adjacent to and/or incorporated into the valve body, the energy requirements can be modified. The water energy generator functions to supplement the battery(ies) or super capacitor(s) for longer durability. In addition, wireless communication can be utilized primarily during the time electrical energy is being generating for the purposes of gathering weather forecast weather data or transmitting flow information to a remote router and then over the Internet to remote servers and databases. The imbedded software residing in the permanent data memory bank in the electronic circuitry of the independent wireless programmable irrigation valve, can make decisions about when to maximize energy use, charging rates to the battery(ies) or super capacitor(s), download weather (rain in the forecast) decisions to temporarily modify the downloaded program or schedule, update imbedded software, etc.

Supplementing the electrical power with utilizing a water energy generator enables less restricted wireless use, expanding the capabilities of the wireless programmable irrigation valve 10 to perform additional features. For example, the ZigBee and Zwave 39, Wi-Fi/Wi-Fi3 38 can communicate with home control systems and smart speaker central hubs such as Amazon Alexa or the Google Home. For example, an individual can state "Alexa zone 1 irrigation for 10 minutes" "download vacation program 1A" and the smart central hub transfers the instructions to the wireless router which will process the instructions for transfer to the wireless programmable irrigation valve 10. The intelligent software of the present invention independent wireless programmable irrigation valve 10 can determine energy increases generated from the watering program or schedule software instructions 52 and if instructed, can modify the schedule. For example, if the downloaded watering program or schedule software instructions define four (4) irrigation zones with a duration of 10 minutes scheduled for three times a week, the intelligent software can estimate energy generation. And during actual irrigation schedules, the intelligent software of the present invention independent wireless programmable irrigation valve 10 can monitor and record the quantity of energy generation. In these applications, the home control systems can utilize a custom watering or scheduling program APP 50 to download the watering program or schedule software instructions 52 to the independent wireless programmable irrigation valve 10.

An optional pressure sensor (not shown) can he included with the independent wireless programmable irrigation valve with optional water turbine energy generator. Since most sprinkler systems perform at a maximum flow rate, the pressure of the water supply will be very useful in calibrating the water energy generator to accurately determine the flow rate and total water used during the sprinkler cycle. The timing duration of the sprinkler cycle can be determined with or without the pressure sensor.

An optional temperature sensor 93 can be included with the electrical circuitry to include additional functionality, for example, when freezing conditions exists, the software can make appropriate adjustments in the scheduling program that has been download. The adjustments most probably will be temporary and such when, for freezing condition ceases, reverts to the original water schedule programming.

The Wake-Up Button 36 functions to wake up the electronic circuitry that is a sleep mode which minimizes wireless communication once the scheduling program has been downloaded and is performing as intended. With the water energy generator 95, the Wake-Up Button may not be included, or its functionality is minimized. As the sleep mode saves energy (and increase energy provided by the water energy generator 95) may allow the wireless communication to schedule its own communication protocol e.g. every 10 minutes send out a digital signal that equivalent to the statement "it anyone out there?". When an initiation of water flow or for an incoming signal is observed, the sleep mode is terminated entering a wake-up interval. The software of the independent wireless programmable irrigation valve can be intelligent such that the wireless communication schedule can be adjusted for minimizing or maximizing power energy capacity or modifying a water schedule (rain or freezing conditions).

Figure 4:
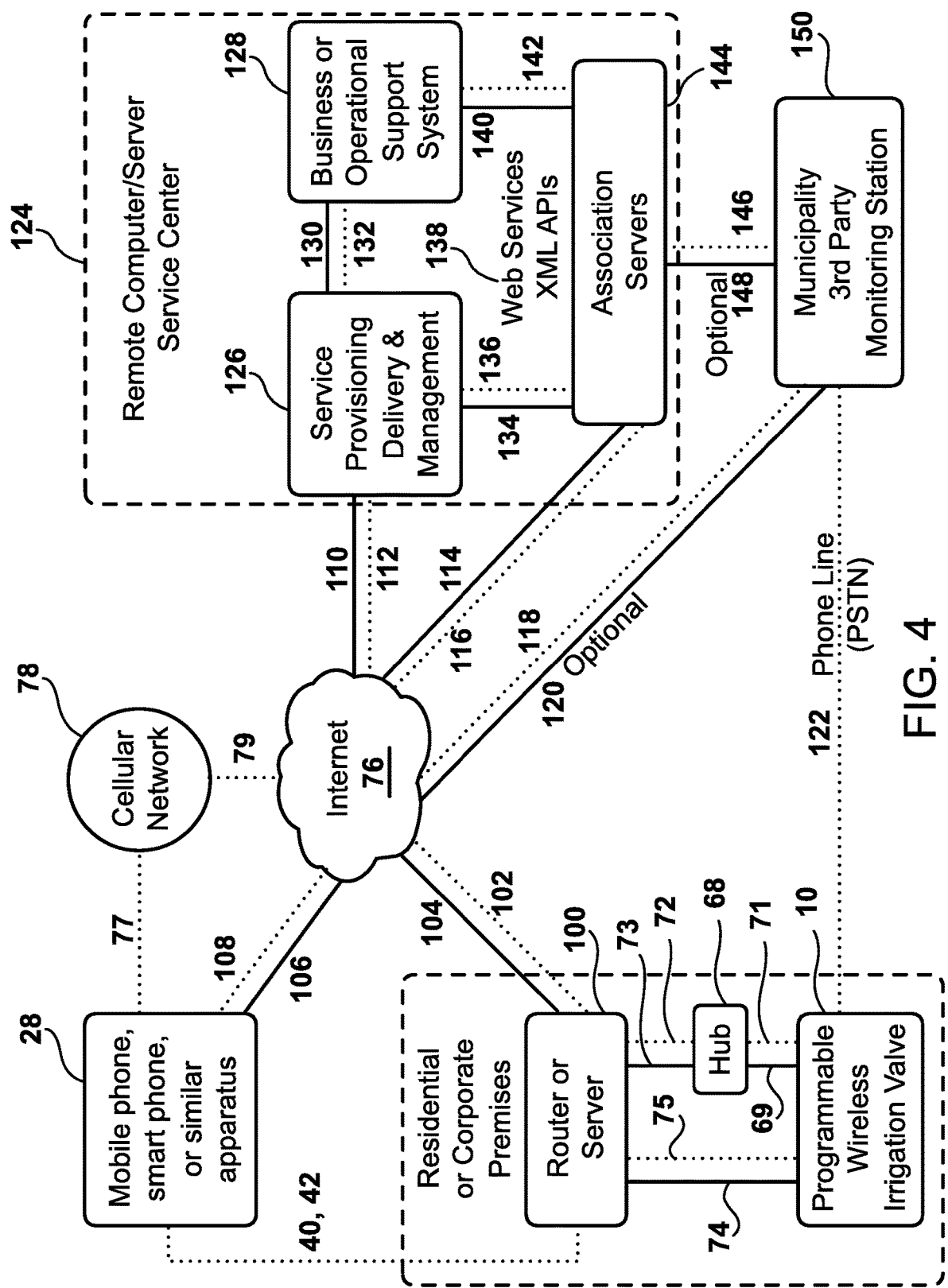
FIG. 4 is a perspective illustration of the components of the internet and cloud server(s) for transmitting and receiving data from the independent wireless programmable irrigation valve.

FIG. 4 is a perspective of the components of the internet and cloud servers for receiving data from the independent wireless programmable irrigation valve. The present invention independent wireless programmable irrigation valve 10 is shown communicating with a router or server 100 either directly 74 or through communication means 69 to a receiving communication hub 68 and then through communication means 73 to a router or servers. Also shown is that through the router or server 100, signals or communication 75 can be sent from the router or server 100 directly to the independent wireless programmable irrigation valve 10, or alternately, from router or server 100 signal or communication 72 that is sent to a hub 68 and then the signal or communication 71 is sent to the present invention independent wireless programmable irrigation valve 10. The router or server 100 then communicates wirelessly or wired to the internet 104, or the internet communication wirelessly or wired 102 to the router or server 100.

Also shown in FIG. 4 is a cell phone, smart phone, mobile phone or similar apparatus 28 that communicates with the router or server 100 by Wi-Fi 40 or Bluetooth 42 technology. The cell phone, smart phone, mobile phone or similar apparatus 28 can wireless use cellular technology to communication with a cellular network 77 which can communication by wireless or wired means 79 to the internet 76. The cell phone, smart phone, mobile phone or similar apparatus 28 can communication directly to the internet 76 through a wireless communication 106 and/or the Internet can wirelessly communicate 108 with the cell phone, smart phone, mobile phone or similar apparatus 28.

The Internet 76 can optionally communicate by wireless and/or wired means 120 to a water municipality or $3^{rd}$ Party monitoring stations 150. Alternately, the water municipality or $3^{rd}$ Party can send wireless and/or wired signals, commands or communications 118 with the internet (for further communication with the router/server 100 and the present invention independent wireless programmable Irrigation valve 10).

The internet 76 can communicate wirelessly and/or wired 110 to a remote computer/server center 124 which has typical service provisioning and delivery management services (BSS) 126 and business or operations support systems (OSS) 128. Alternately, the remote computer/server center 124 can send wireless and or wired signals, commands, or communications with the Internet 112 (for further communication with the router/server 100 and the present invention independent wireless programmable irrigation valve 10). Shown also is communication lines 130, 132 between the typical service provisioning and delivery management services 126 and business or operations support systems 128.

The remote computer components that manage the typical BSS 126 and OSS 128 elements of the remote computer service, but this only exemplary and is not so limited. Several of the component defined and described can be replaces by a newly design operation(s), combine operations, or eliminate some operation(s). Professional companies, such as Amazon Web Services, handle most if not all, of the OSS and BSS services, database access, connectivity and database maintenance (e.g. SQL databases like MySQL, MariaSQL, and Aurora, Redshift, and non-SQL databases like Dynamodb), server component access and maintenance and load balancing, all for a cost base on various factors. Data access by cell phones, mobile phones, and similar apparatus 400, and remote computers can access the commercial database using certain protocols.

These large cloud-computing or cloud service companies with server farm around the world are becoming very successful and replacing the independent comprehensive internet infrastructure and communication network. Companies like Amazon®; (Microsoft®, Oracle® and Google®) 124 have all built a significant quantity of computing infrastructure. Their data centers are vastly bigger, and significantly more efficient, than those operated by or could be built by most other independent companies. The cloud-computing companies with their worldwide server farms allow for scalable and redundant data storage capabilities (Redundant Array of Independent Disks or RAID technology). The large cloud-computer companies 124 can temporarily extend or customize the functionality for a client by transferring logic to it that it can execute. Exa.rtq.,,les of this may include compiled components such as Java applets and client-side scripts such as JavaScript. Complying with these constraints and thus conforming to the REST architectural style (REST an acronym for REpresentational State Transfer) 144, which will enable any kind of distributed hypermedia system to have desirable emergent properties, such as performance, scalability of simplicity, modifiability, visibility, portability and reliability. These large companies are presently marketing and rented out their computing capacity to developers and companies around the world. The developer or company doesn't have to incur the capital expense associated with designing network connectivity system, employing various Information technology (IT) professionals, purchasing the necessary computers and servers, developing the custom and non-custom software and conducting the significant maintenance procedures.

A developer or a company simply pays for the cloud service companies operational equipment and skills. Using the cloud service company provide the developer and company access to fundamentally unlimited computing power marketed by the cloud computing companies. And the amenities are similar between the major cloud computing companies which offer the same basic set of services.

Infrastructure as a Service, or "IaaS" which is the most basic layer of cloud computing. It provides customers with virtual servers and database storage and Internet of Things (IoT) sensor communication and access.

Platform as a Service, or "PaaS," which is the set of application tools and services that make it easier for developers and IT professionals to build applications without concern or knowledge about which servers the applications are running on.

"Software as a Service," or SaaS, which refers to applications that run in the cloud like Microsoft's Office 365, Google's G Suite and Salesforce's products for sales and marketing.

The basic marketing plan for a cloud service company(s) is to make their services indispensable to both independent software developers and big companies. Customers might initiate efforts in cloud computing with a single software application (APP) 144 but as their businesses grow, the cloud service company(s) are expecting that their cloud usage will also increase. Amazon even defines the "virtuous" cycle that has helped drive the cloud industry, by sacrificing short-term profits to enhance the customer experience and maximize long-term gain. The more customers a cloud platform provider contracts with, the more servers and serving farms under their control can be developed. And the more servers the cloud service company(s) have, the better they can take advantage of economies of scale and offer customers lower prices for more robust features, including appeal to large enterprises. This supports that the near future of internet infrastructures and communication networks will increasing be controlled and maintained by the large cloud service company(s).

Specific communication protocols 144 are becoming important to interface between the cloud service company(s) and the company's local or cloud database for computer, cell phone, smart phone and similar apparatus, smart internet TVs, smart central hub listening and speaker devices, and home control systems, access to acquire requested data (e.g. SQL database requests) and perform instructional activities (turn on/off water), Of these protocols, the Representational state transfer or RestAPI (or REST API), Jav API or XML API 144 seem to be appropriate.

Once a user sets up a service, an activation application delivers a first display or notice to the user on either a display means of the computer, cell phone, smart phone, mobile phone or similar apparatus 28, computer, smart internet TVs, smart central hub listening and speaker devices, and home control systems, optionally on the present invention independent wireless programmable irrigation valve 10 and/or on a display means on the remote devices 28. This pairing technology or other application secure means associates a new user with a purchased or installed remote device and the present invention independent wireless programmable irrigation valve 10. Generally, all this is needed for communication to a private router or server 100 is the SSID and password.

Shown in FIG. 4 is he communication means 134 from the BSS and the associated servers 144. Alternately the associated service can have a communication means 134 with the BSS. Similarly, there is a communication means 140 from the OSS and the associated servers 144 with a return communication means 142 from the associated servers to the OSS.

Further, the associated servers 144 can include a communication means 148 to the municipality and/or 3$^{rd}$ party 150 so their own computers and displays has access to the data being transferred.

Lastly, the present invention independent wireless programmable irrigation valve 10 can communicate using older phone lines (PSTN) to communicate with the municipality and/or 3$^{rd}$ party 150.

A number of applications provided by the large cloud companies service company(s) ensure overall management of the computer infrastructure and network service. These pre-defined applications are configured to offer off-the-shelf programs and operating systems solutions management of the integrated cloud-computing system service, overall service monitoring, customer support, and reporting.

It is hallmark of the present invention that independent programmable irrigation valve can be programmed with a watering schedule by a cell, smart or mobile phone or similar apparatus, wireless router, intelligent speaker hub or other wireless apparatus and once it is programmed with the watering schedule, it will perform the schedule with no further communication with any other apparatus. The independent programmable irrigation valve can be programmed with a watering schedule at one location and transferred to other located for performing the watering schedule.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure that arise from known or customary practice and the art to which this invention pertains, and which fall within the limits of the appended claims.

The invention claimed is:

1. An independent wireless programmable irrigation valve comprising:

the independent wireless programmable irrigation valve that is programmed and functions without the need for or including a separate and independent irrigation controller;

a water control valve mechanism;

an electronic circuitry compromising at least one of a CPU, a microprocessor, or a microcontroller or any combination thereof, a memory module that can store a water irrigation schedule;

the electronic circuitry having a power supply that comprises one or more standard batteries, one or more rechargeable batteries, or one or more super capacitors, or any combination thereof;

a timing circuitry for performing the water irrigation schedule;

a one or more wireless communication transceivers, at least one of the one or more wireless communication transceivers configured to communicate via:

a wireless technology standard that is used for exchanging data between fixed and mobile devices over short distances based on the IEEE 802.15.1;

a wireless technology that operates in the 908-916 MHz bands and 912-920 MHz bands operating with a mesh or star topology, or any combination thereof;

a communication protocol used to create personal area networks in a low-power, low-data-rate, wireless ad hoc network based on the IEEE 802.15.4;

a wireless network protocol based on the IEEE 802.11 standards;

a wireless network protocol based on an IEEE 802.11 standard;

a low-power, low-data-rate wireless ad hoc network based on IEEE 802.15.4;

an interoperable implementation of an IEEE 802.16 family of wireless-networks standards;

a low power and long-range chirp spread modulation technology;

a third-generation wireless mobile telecommunication technology and protocols;

a fourth-generation wireless mobile telecommunication technology and protocols;

or a fifth-generation wireless mobile telecommunication technology and protocols;

or any combination thereof;

wherein the electronic circuitry comprising the wireless communication transceiver or the CPU, the microprocessor, or the microcontroller or any combination thereof, enters a sleep mode that monitors for a water flow, the sleep mode turns off when the water flow starts or when the water irrigation schedule starts, or combination thereof, and the sleep mode resumes when the water flow ends or when the water irrigation schedule ends, or any combination thereof;

wherein the sleep mode is interrupted by initiating wireless transmission of water flow data, uploading a new or updated water irrigation schedule, or providing software updates, or any combination thereof; and a software residing in the memory module of the electronic circuitry, that determines at least one of: (i) when to maximize energy use, (ii) charging rates for the batteries or super capacitors, (iii) or downloads a weather information or recognizes when rain in a forecast to temporarily suspend the downloaded program or schedule operation, or any combination thereof;

the one or more wireless communication transceiver requires an authentication procedure to register and allow communication between the independent wireless programmable irrigation valve, with a remote computer or an electronic communication device, or any combination thereof, a water flow sensor connected to the electrical circuitry, wherein the CPU, the microprocessor, or the microcontroller including instructions that, when executed configures the water flow sensor to monitor a water use, a water use duration, and a total water volume establishing one or more sprinkler events; and transmitting the water use, the water use duration or the total water volume or any combination thereof, to the remote computer, the electronic communication device or to a cloud service company, or any combination thereof.

2. The independent wireless programmable irrigation valve as recited in claim 1, wherein the water control valve mechanism comprises a latching type of solenoid valve or a standard irrigation control valve technology.

3. The independent wireless programmable irrigation valve as recited in claim 1, further comprising a water electrical energy generator that is electrically connected and providing an auxiliary electrical energy to the one or more rechargeable batteries or the one or more super capacitor capacitors, or any combination thereof.

4. The independent wireless programmable irrigation valve as recited in claim 1, said independent wireless programable irrigation valve including a security code or a MAC address utilized as a security feature to prevent theft or modify the water irrigation schedule.

5. The independent wireless programmable irrigation valve as recited in claim 1, comprising the timing circuitry configured to download a timing information from a satellite source or an internet connection.

6. The independent wireless programmable irrigation valve as recited in claim 1, further comprising a communication hub with a one or more second wireless communication transceivers configured to (i) extend a wireless range of the independent wireless programmable irrigation valve or (ii) include a mesh technology to communicate with two or more independent wireless programmable irrigation valves, or any combination thereof, the communication hub further establishes a communication with an internet connection, a public network or a corporate network, and to the remote computer or the cloud service company, or any combination thereof.

7. The independent wireless programmable irrigation valve as recited in claim 6, wherein the communication hub or the independent wireless programmable irrigation valve transmit the one or more sprinkler events to the cloud service company utilizing an API protocol, the API protocol including a representational state transfer RestAPI (or REST API), a Java API or a XML API, or any combination thereof.

8. The independent wireless programmable irrigation valve as recited in claim 1, wherein the electronic communication device comprises a cell phone, a smartphone, a mobile phone, a remote computer, a PDA, a tablet, a TV with internet connectivity, a watch with wireless internet connectivity, or computerized glasses or any combination thereof.

9. The independent wireless programmable irrigation valve as recited in claim 8, is configured to be programmed with the water irrigation schedule utilizing an irrigation water program (APP) on the electronic communication device, the remote computer, or connected to a smart speaker hub technology, or any combination thereof, to (i) transmit the one or more sprinkler events on a programmable defined frequency or (ii) transmit the one or more sprinkler events upon a demand signal.

10. The independent wireless programmable irrigation valve as recited in claim 1, wherein the one or more wireless communication technologies transceivers communicate through a remote router, server or access point or to an internet connection or a satellite for downloading weather forecast information.

11. The independent wireless programmable irrigation valve as recited in claim 1, wherein the one or more wireless communication transceivers are configured to communicate with the electronic communication device or the remote computer for at least one of downloading the water irrigation schedule or an irrigation process instruction, set wireless technology parameters, or modify settings within the independent wireless programmable irrigation valve, or any combination thereof.

12. The independent wireless programmable irrigation valve as recited in claim 6, wherein the communication hub is configured to receive the water irrigation schedule, or transferring the one or more sprinkler events to the remote computer or the cloud service company, or any combination thereof.

13. The independent wireless programmable irrigation valve as recited in claim 1 further comprising a pressure sensor valve configured to detect and report a leak condition.

14. The independent wireless programmable irrigation valve as recited in claim 1, wherein the at least one or more wireless communication transceivers transmit the water use, the water use duration or the total water volume, or any combination thereof, to an access point or to an internet connection and further transmitted to the remote computer or the cloud service company.

15. The independent wireless programmable irrigation valve as recited in claim 9, wherein the electronic communication device utilizing the irrigation water program APP for performing at least one of:
(i) downloading the water irrigation schedule to the independent wireless programmable irrigation valve;
(ii) transmitting a water data compromising at least of one or the water use, the water use duration, or the total water volume or any combination thereof, to a computer, or over the internet to the remote computer or to the cloud service company; or (iii) downloading the water data from the remote computer or the cloud service company to the electronic communication device.

16. The independent wireless programmable irrigation valve as recited in claim 9, wherein the independent wireless irrigation valve is programmed with a irrigation water program (APP) on the electronic communication device or the remote computer, or connected to a smart speaking hub technology, or any combination thereof, to (i) transmit the one or more sprinkler events on a programming defined frequency (e.g. daily, weekly), or (ii) transmitting the one or more sprinkler events upon a demand signal.

17. The independent wireless programmable irrigation valve as recited in claim 1, wherein the programmable irrigation valve include software instructions configured to communicate through the one or more wireless communication technology transceiver with a smart speaker central hub.

18. The independent wireless programmable irrigation valve as recited in claim 1, further including a temperature sensor.

19. The independent wireless programmable irrigation valve as recited in claim 1 further comprising a geolocation technology utilizing software triangulation with a Wi-Fi, a cellular technology with cell towers, or utilizing a GPS technology, or any combination thereof, to provide a geolocation position for the programmable irrigation valve.

20. The independent wireless programmable irrigation valve as recited in claim 19, wherein a security code or MAC address is required to initially or subsequently to operate the independent wireless programmable irrigation valve that has detected a new location.

21. An independent wireless programmable irrigation valve comprising:
the independent wireless programmable irrigation valve that is programmed and functions without the need for a separate and independent irrigation controller;
a water control valve mechanism;
an electronic circuitry compromising at least one of a CPU, a microprocessor, or a microcontroller or any combination thereof,
a memory module that stores and performs a water irrigation schedule;
the electronic circuitry having a power supply that comprises one or more standard batteries, one or more rechargeable batteries, or one or more super capacitors, or any combination thereof;
a timing circuitry for performing the water irrigation schedule;
a one or more wireless communication transceivers, at least one of the one or more wireless communication transceivers configured to communicate via:
a wireless technology standard that is used for exchanging data between fixed and mobile devices over short distances based on the IEEE 802.15.1;
a wireless technology that operates in the 908-916 MHz bands and 912-920 MHz bands operating with a mesh or star topology, or any combination thereof;
a communication protocol used to create personal area networks in a low-power, low-data-rate, wireless ad hoc network based on the IEEE 802.15.4;
a wireless network protocol based on an IEEE 802.11 standard;
a low-power, low-data-rate wireless ad hoc network based on IEEE 802.15.4;
an interoperable implementation of an IEEE 802.16 family of wireless-networks standards;
a low power and long-range chirp spread modulation technology;
a third-generation wireless mobile telecommunication technology and protocols;
a fourth-generation wireless mobile telecommunication technology and protocols;
or
a fifth-generation wireless mobile telecommunication technology and protocols;
or any combination thereof;
the independent wireless programmable irrigation valve is configured to communicate with a communication hub, the communication hub having a second electrical circuitry including at least one of a second CPU, a second microprocessor, or a second microcontroller, or any combination thereof, one or more second wireless transceivers and a second power source;
the communication hub with the one or more second wireless transceivers configured to (i) extend the wireless range or (ii) include mesh technology to communicate with two or more independent wireless programmable irrigation valves, or any combinations thereof, and to establish communication with an internet connection, a public network or a corporate network, or any combination thereof, that communicates with a remote computer or a cloud service company, or any combination thereof;
wherein the electronic circuitry comprising the wireless communication transceiver or the CPU, microprocessor, or the microcontroller or any combination thereof, enters a sleep mode that monitors for a water flow, the sleep mode turns off when the water flow starts or when the water irrigation schedule starts, or combination thereof, and the sleep mode resumes when the water flow ends or when the water irrigation schedule ends, or any combination thereof;
wherein the sleep mode is interrupted by initiating wireless transmission of water flow data, uploading a new or updated water irrigation schedule, or providing software updates, or any combination thereof; and
a software residing in the memory module of the electronic circuitry, that determines at least one of (i) when to maximize energy use, (ii) charging rates for the batteries or super capacitors, (iii) or downloads a weather information or recognizes when rain in a forecast, to temporarily suspend the water irrigation schedule operation, or any combination thereof;
the one or more wireless communication transceiver requires an authentication procedure to register and allow communication between the independent wireless programmable irrigation valve, with a remote computer or an electronic communication device, or any combination thereof,
a water flow sensor connected to the electrical circuitry, wherein the CPU, the microprocessor, or the microcontroller including instructions that, when executed, configures the water flow sensor to monitor a water use, a water use duration, and a total water volume establishing one or more sprinkler events; and
transmitting the water use, the water use duration or the total water volume or any combination thereof, to the remote computer, the electronic communication device or to the cloud service company, or any combination thereof.

22. The independent wireless programmable irrigation valve as recited in claim 21, wherein the water control valve mechanism comprises a latching type of solenoid valve or a standard irrigation control valve technology.

23. The independent wireless programmable irrigation valve as recited in claim 21, further comprising a water electrical energy generator that is electrically connected and providing an auxiliary electrical energy to one or more rechargeable batteries or the one or more super capacitors.

24. The independent wireless programmable irrigation valve as recited in claim 21, wherein the independent wireless programable irrigation valve including a security code or a MAC address utilized as a security feature to prevent theft or modify the water irrigation schedule.

25. The independent wireless programmable irrigation valve as recited in claim 21, wherein the electronic communication device comprises a cell phone, a smartphone, a mobile phone, a remote computer, a PDA, a tablet, a TV with internet connectivity, a watch with wireless internet connectivity, computerized glasses or any combination thereof.

26. The independent wireless programmable irrigation valve as recited in claim 21, wherein the communication hub is configured to receive the water irrigation schedule, or transferring the one or more sprinkler events to the remote computer or the cloud service company, or any combination thereof.

27. The independent wireless programmable irrigation valve as recited in claim 21, compromising the timing circuitry configured to download a timing information from a satellite source or an internet connection source.

28. The independent wireless programmable irrigation valve as recited in claim 25, wherein the independent wireless irrigation valve is programmed with a irrigation water program (APP) on the electronic communication device or the remote computer, or connected to a smart speaker hub technology, or any combination thereof, to (i) transmit the one or more sprinkler events on a programming defined frequency (e.g. daily, weekly), or (ii) transmitting the one or more sprinkler events upon a demand signal.

29. The independent wireless programmable irrigation valve as recited in claim 21, wherein the one or more wireless communication transceivers of the independent wireless programable irrigation valve communicates, or the one or more second wireless transceivers technology of the communication hub communicate, through a remote router, a server or an access point apparatus to an internet connection or a satellite for downloading weather forecast information.

30. The independent wireless programmable irrigation valve as recited in claim 29, wherein the programmable irrigation valve includes software which postpones the the water irrigation schedule when raining condition is observed in the weather forecast.

31. The independent wireless programmable irrigation valve as recited in claim 21, wherein the communication hub or the independent wireless programmable irrigation valve transmits the one or more sprinkler events to the cloud service company utilizing an API protocol, the API protocol including a representational state transfer RestAPI (or REST API), a Java API or a XML API, or any combination thereof.

32. The independent wireless programmable irrigation valve as recited in claim 21, further comprising a pressure sensor.

33. The independent wireless programmable irrigation valve as recited in claim 6, wherein the one or more second wireless transceivers technology of the technology hub or the communication hub utilizes a satellite or an internet connection to download weather forecast information.

34. The independent wireless programmable irrigation valve as recited in claim 28, wherein the electronic communication device utilizing the irrigation water program APP for performing at least one of:
(i) downloading the water irrigation schedule to the independent wireless programmable irrigation valve;
(ii) transmitting a water data compromising at least one of the water use, the water use duration or the total water volume or any combination thereof, to a computer or over the internet to the remote computer or to the cloud service company; and
(iii) downloading the water data from the remote computer or the cloud service company to the electronic communication device.

35. The independent wireless programmable irrigation valve as recited in claim 1 further comprising a geolocation technology utilizing software triangulation with a Wi-Fi, a cellular technology with cell towers, or utilizing a GPS technology, or any combination thereof, to provide a geolocation position for the programmable irrigation valve.

36. The independent wireless programmable irrigation valve as recited in claim 21, further including a temperature sensor.

37. The independent wireless programmable irrigation valve as recited in claim 21, further comprising a geolocation technology utilizing software triangulation with a Wi-Fi, a cellular technology with cell towers, or utilizing a GPS technology, or any combination thereof, to provide a geolocation position for the programmable irrigation valve.

38. The independent wireless programmable irrigation valve as recited in claim 37, wherein a security code or MAC address is required to initially or subsequently to operate the independent wireless programmable irrigation valve that has detected a new location.

* * * * *